(12) United States Patent
Wada et al.

(10) Patent No.: US 11,502,312 B2
(45) Date of Patent: Nov. 15, 2022

(54) RESIN FRAME EQUIPPED MEMBRANE ELECTRODE ASSEMBLY AND METHOD OF PRODUCING RESIN FRAME MEMBER FOR FUEL CELL

(71) Applicant: HONDA MOTOR CO., LTD., Tokyo (JP)

(72) Inventors: Yusuke Wada, Wako (JP); Taichi Kitagawa, Wako (JP); Ryo Takano, Wako (JP); Kento Kusatsugu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 17/204,305

(22) Filed: Mar. 17, 2021

(65) Prior Publication Data

US 2021/0296662 A1 Sep. 23, 2021

(30) Foreign Application Priority Data

Mar. 18, 2020 (JP) .............................. JP2020-047165

(51) Int. Cl.
 *H01M 8/0273* (2016.01)
 *H01M 8/0284* (2016.01)
 *H01M 8/0286* (2016.01)
 *H01M 8/1004* (2016.01)

(52) U.S. Cl.
 CPC ....... *H01M 8/0273* (2013.01); *H01M 8/0284* (2013.01); *H01M 8/0286* (2013.01); *H01M 8/1004* (2013.01)

(58) Field of Classification Search
 None
 See application file for complete search history.

(56) References Cited

U.S. PATENT DOCUMENTS

| 2009/0286121 | A1* | 11/2009 | Morimoto | ........... | H01M 8/1004 |
| | | | | | 429/494 |
| 2014/0120452 | A1* | 5/2014 | Yamauchi | ........... | H01M 8/0273 |
| | | | | | 429/480 |
| 2017/0069926 | A1* | 3/2017 | Jeong | ................... | H01M 8/0273 |
| 2018/0166707 | A1* | 6/2018 | Ohmori | ............... | H01M 8/0273 |
| 2021/0280878 | A1* | 9/2021 | Wada | ................... | H01M 8/0273 |
| 2021/0296663 | A1* | 9/2021 | Takano | ..................... | B32B 3/30 |

FOREIGN PATENT DOCUMENTS

JP          2018-097917 A      6/2018

* cited by examiner

*Primary Examiner* — Alix E Eggerding
(74) *Attorney, Agent, or Firm* — Carrier Blackman & Associates, P.C.

(57) ABSTRACT

A resin frame member is produced by using a method of producing a resin frame member for a fuel cell. An inner peripheral end of the resin frame member includes an inclined surface formed over the entire periphery thereof. The inclined surface is inclined inward from one surface of the resin frame member toward the other surface of the resin frame member. The width of the inclined surface is gradually reduced from the center toward both ends of each side part of the inner peripheral end in a direction in which the side part of the inner peripheral end extends.

10 Claims, 8 Drawing Sheets

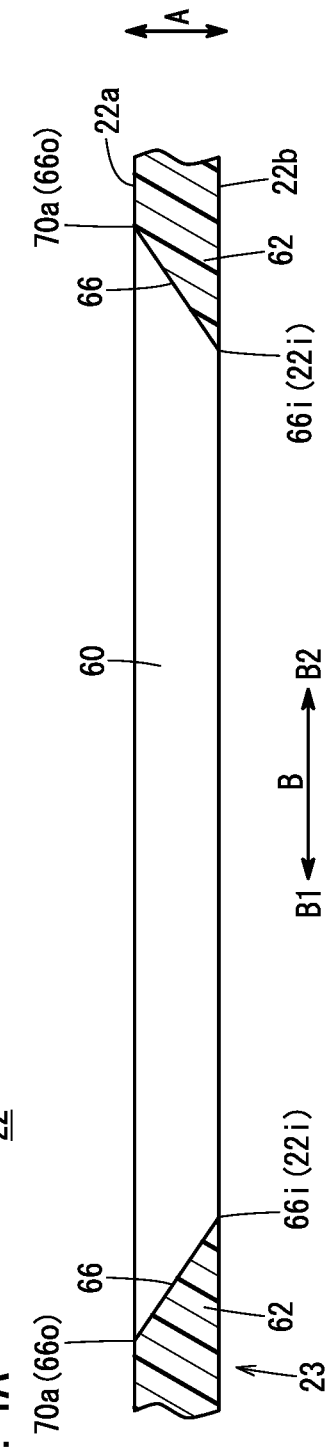
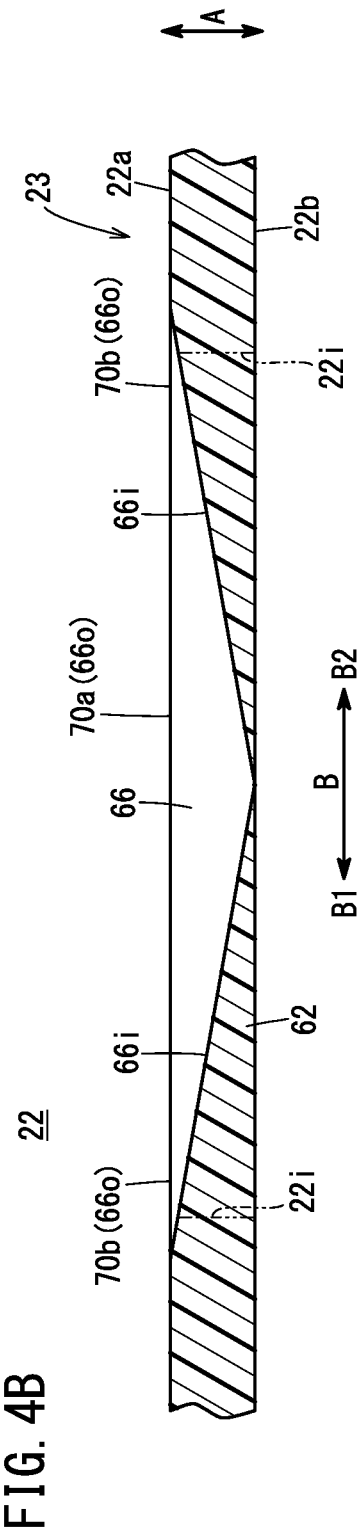

RESIN FRAME EQUIPPED MEMBRANE ELECTRODE ASSEMBLY AND METHOD OF PRODUCING RESIN FRAME MEMBER FOR FUEL CELL

CROSS-REFERENCE TO RELATED APPLICATION

This application is based upon and claims the benefit of priority from Japanese Patent Application No. 2020-047165 filed on Mar. 18, 2020, the contents of which are incorporated herein by reference.

BACKGROUND OF THE INVENTION

Field of the Invention

The present invention relates to a resin frame equipped membrane electrode assembly and a method of producing a resin frame member for a fuel cell.

Description of the Related Art

For example, a power generation cell is formed by sandwiching a resin frame equipped membrane electrode assembly (resin frame equipped MEA) between a pair of separators. The resin frame equipped MEA includes a membrane electrode assembly (MEA) and a quadrangular annular resin frame member provided on an outer peripheral portion of the MEA. The MEA includes an electrolyte membrane, an anode provided on one surface of the electrolyte membrane, and a cathode provided on the other surface of the electrolyte membrane.

In the state where an inner peripheral end of the resin frame member is disposed between an outer peripheral portion of the anode and an outer peripheral portion of the cathode, the inner peripheral end of the resin frame member is joined to the electrolyte membrane. In the resin frame member, when the cross section of the inner peripheral end in the thickness direction has a quadrangular shape, a gap (portion where the electrolyte membrane and the electrode are spaced from each other) is formed inside the inner peripheral end of the resin frame member. In the resin frame equipped MEA, the gap formed inside the inner peripheral end of the resin frame member is an area where no power generation is performed. Therefore, the power generation efficiency of the power generation cell is lowered.

For example, Japanese Laid-Open Patent Publication No. 2018-097917 discloses a resin frame equipped MEA where the gap inside the inner peripheral end of the resin frame member is reduced. An inclined surface is formed at the inner peripheral end of the resin frame member of the resin frame equipped MEA. The inclined surface is inclined from a surface of the inner peripheral end closer to the electrolyte membrane toward a surface of the inner peripheral end opposite to the electrolyte membrane.

SUMMARY OF THE INVENTION

The present invention has been made in relation to the above conventional technique, and an object of the present invention is to provide a resin frame equipped membrane electrode assembly and a method of producing a resin frame member for a fuel cell which makes it possible to increase the production efficiency of producing the resin frame member and improve the power generation efficiency.

According to an aspect of the present invention, a resin frame equipped membrane electrode assembly is provided. The resin frame equipped membrane electrode assembly includes a membrane electrode assembly and a resin frame member provided on an outer peripheral portion of the membrane electrode assembly. The membrane electrode assembly includes an electrolyte membrane, a first electrode provided on one surface of the electrolyte membrane, and a second electrode provided on the other surface of the electrolyte membrane. An inner peripheral end of the resin frame member is formed in a quadrangular annular shape so as to surround the outer peripheral portion of the membrane electrode assembly, and is disposed between an outer peripheral portion of the first electrode and an outer peripheral portion of the second electrode. The inner peripheral end includes an inclined surface formed over an entire periphery thereof, the inclined surface being inclined inward from a first surface of the resin frame member toward a second surface of the resin frame member. The width of the inclined surface is gradually reduced from the center toward both ends of each side part of the inner peripheral end in a direction in which the side part of the inner peripheral end extends.

According to another aspect of the present invention, a method of producing a resin frame member for a fuel cell by forming an inclined surface at an inner peripheral end surrounding a quadrangular opening formed in a central part of the resin film, the resin frame member being provided on an outer peripheral portion of a membrane electrode assembly, the method including: a disposing step of disposing a laser emission port at a center of the opening of the resin film; and a laser processing step of irradiating the inner peripheral end with a laser beam (L) emitted from the laser emission port disposed at the center of the opening to thereby form the inclined surface at the inner peripheral end, wherein, in the laser processing step, the laser beam is applied to the inner peripheral end over an entire periphery thereof in a state where an optical axis of the laser beam is oriented in an inclination direction intersecting with a planar direction of the resin film and a thickness direction of the resin film.

In the present invention, the inner peripheral end of the resin frame member includes the inclined surface. That is, the thickness of the inner peripheral end of the resin frame member is gradually reduced toward the inside. Therefore, it is possible to reduce the gap inside the inner peripheral end of the resin frame member. Thus, since the area of the power generation region is increased, it is possible to improve the power generation efficiency.

Further, the inclined surface is formed by irradiating the inner peripheral end of the resin film with the laser beam emitted from the laser emission port disposed at the center of the opening of the resin film, over the entire periphery of the inner peripheral end. At this time, the inclined surface is formed so as to gradually narrow from the center toward both ends of each side part of the inner peripheral end of the resin frame member in the direction in which each of the side parts extends. In this case, since the laser emission port is disposed at the center of the opening, it is not necessary to move the laser emission port along the inner peripheral end of the resin film in a quadrangular pattern. Accordingly, it is possible to achieve reduction in the cycle time of the laser processing step. Thus, it is possible to improve the production efficiency of producing the resin frame member.

The above and other objects, features and advantages of the present invention will become more apparent from the following description when taken in conjunction with the

BRIEF DESCRIPTION OF THE DRAWINGS

FIG. 4A is a lateral cross sectional view taken along a line IVA-IVA in FIG. 3;

FIG. 4B is a lateral cross sectional view taken along a line IVB-IVB in FIG. 3;

DESCRIPTION OF THE PREFERRED EMBODIMENTS

Hereinafter, a preferred embodiment of a resin frame equipped membrane electrode assembly and a method of producing a resin frame equipped assembly for a fuel cell according to the present invention will be described with reference to the accompanying drawings.

Figure 1:
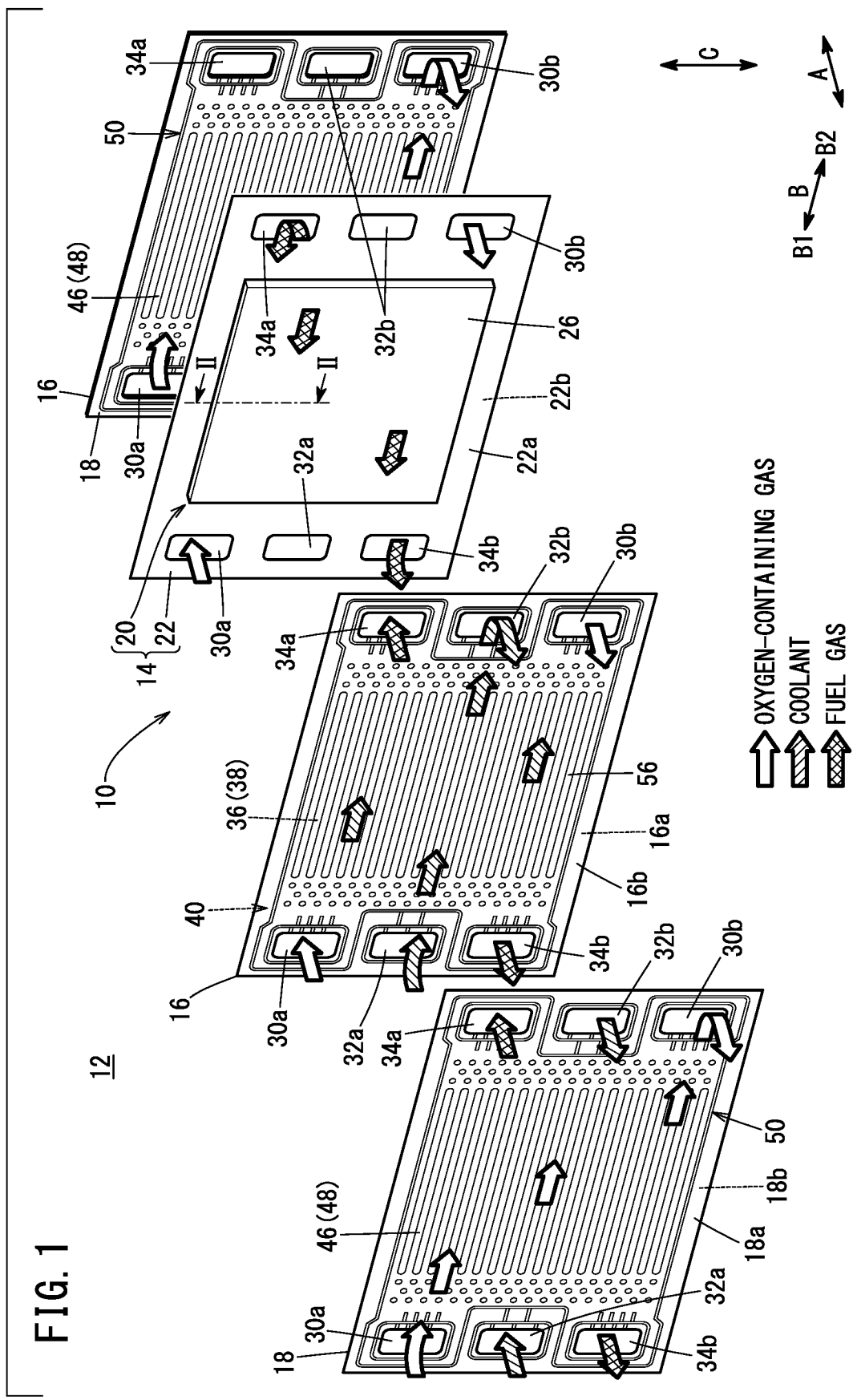
FIG. 1 is an exploded perspective view with partial omission including a power generation cell according to an embodiment of the present invention.
Figure 2:
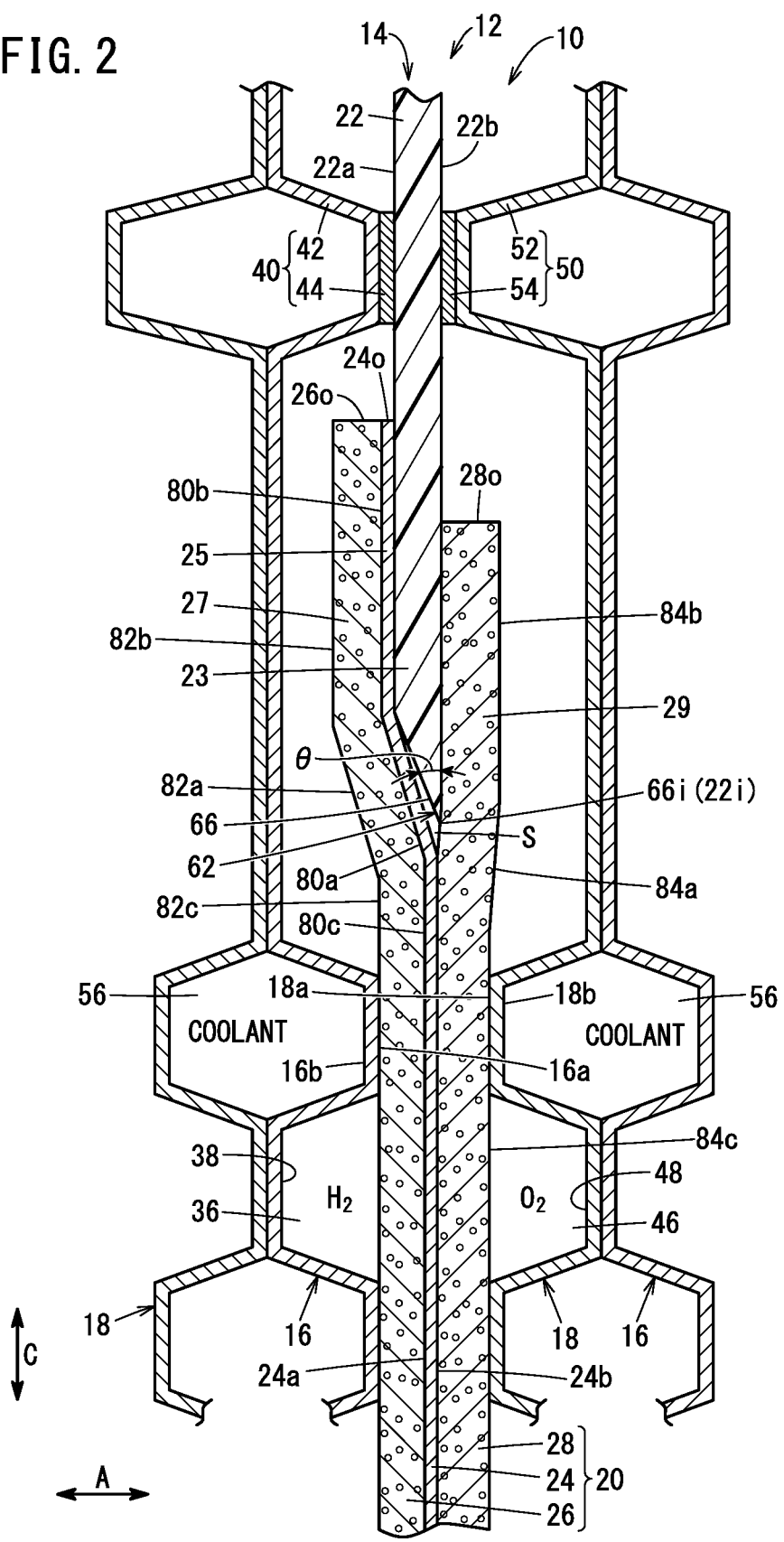
FIG. 2 is a cross sectional view taken along a line II-II in FIG. 1.

As shown in FIGS. 1 and 2, a plurality of power generation cells 10 are stacked together in a thickness direction of the power generation cells 10 (direction indicated by an arrow A) to form a fuel cell stack 12. For example, the fuel cell stack 12 is used as an in-vehicle fuel cell stack mounted in a fuel cell electric automobile (not shown). It should be noted that the stacking direction of the plurality of the power generation cells 10 may be oriented in either a horizontal direction, or the gravity direction.

In FIG. 1, the power generation cell 10 has a laterally elongated rectangular shape. It should be noted that the power generation cell 10 may have a longitudinally elongated rectangular shape. As shown in FIGS. 1 and 2, the power generation cell 10 includes a resin frame equipped membrane electrode assembly (hereinafter referred to as the "resin frame equipped MEA 14"), and a first separator 16 and a second separator 18 provided on both sides of the resin frame equipped MEA 14, respectively. The resin frame equipped MEA 14 includes a membrane electrode assembly (hereinafter referred to as the "MEA 20", and a resin frame member 22 (resin frame part, resin film) provided on an outer peripheral portion of the MEA 20.

In FIG. 2, the MEA 20 includes an electrolyte membrane 24, an anode 26 (first electrode) provided on one surface 24a of the electrolyte membrane 24, and a cathode 28 (second electrode) provided on the other surface 24b of the electrolyte membrane 24. For example, the electrolyte membrane 24 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 24. Alternatively, an HC (hydrocarbon) based electrolyte may be used as the electrolyte membrane 24. The electrolyte membrane 24 is held between the anode 26 and the cathode 28.

Though not shown in details, the anode 26 includes a first electrode catalyst layer joined to one surface 24a of the electrolyte membrane 24, and a first gas diffusion layer stacked on the first electrode catalyst layer. The first electrode catalyst layer is formed by depositing porous carbon particles uniformly on the surface of the first gas diffusion layer, and platinum alloy is supported on surfaces of the carbon particles.

The cathode 28 includes a second electrode catalyst layer joined to the other surface 24b of the electrolyte membrane 24, and a second gas diffusion layer stacked on the second electrode catalyst layer. The second electrode catalyst layer is formed by depositing porous carbon particles uniformly on the surface of the second gas diffusion layer, and platinum alloy is supported on surfaces of the carbon particles. Each of the first gas diffusion layer and the second gas diffusion layer comprises a carbon paper, a carbon cloth, etc.

The surface size (outer size) of the anode 26 is larger than the surface size of the cathode 28. The surface size of the electrolyte membrane 24 is the same as the surface size of the anode 26. An outer peripheral end 26o of the anode 26 is positioned outside the outer peripheral end 28o of the cathode 28. In the surface direction of the electrolyte membrane 24 (in the direction indicated by the arrow C in FIG. 2), an outer peripheral end 24o of the electrolyte membrane 24 is present at the same position as the outer peripheral end 26o of the anode 26.

The surface size of the anode 26 may be smaller than the surface size of the cathode 28. In this case, the outer peripheral end 26o of the anode 26 is positioned inside the outer peripheral end 28o of the cathode 28. The surface size of the electrolyte membrane 24 may be the same as the surface size of the anode 26. Alternatively, the surface size of the electrolyte membrane 24 may be the same as the surface the cathode 28. The surface size of the anode 26 may be the same as the surface size of the cathode 28. In this case, in the surface direction of the electrolyte membrane 24, the outer peripheral end 24o of the electrolyte membrane 24, the outer peripheral end 26o of the anode 26 and the outer peripheral end 28o of the cathode 28 are present at the same position.

In FIGS. 1 and 2, the resin frame member 22 is a single frame shaped sheet provided around the outer peripheral portion of the MEA 20. The resin frame member 22 is an electrically insulating member. Examples of materials of the resin frame member 22 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. The details of the resin frame member 22 will be described later.

In FIG. 1, each of the first separator 16 and the second separator 18 has a rectangular shape (quadrangular shape). Each of the first separator 16 and the second separator 18 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. It should be noted that each of the first separator 16 and the second separator 18 may be made of carbon, etc. In the state where the first separator 16 and the second separator 18 are stacked together, the outer peripheral portions of the first separator 16 and the second separator 18 are joined together by welding, brazing, crimping, etc.

At one end of the power generation cell 10 in the long side direction B (end in the direction indicated by the arrow B1), an oxygen-containing gas supply passage 30a, a coolant supply passage 32a, and a fuel gas discharge passage 34b are arranged in the short side direction (direction indicated by the arrow C) of the power generation cells 10. An oxygen-containing gas is supplied through the oxygen-containing gas supply passage 30a in the direction indicated by the arrow A. A coolant (e.g., pure water, ethylene glycol, oil) is supplied through the coolant supply passage 32a in the direction indicated by the arrow A. A fuel gas (e.g., hydrogen-containing gas) is discharged through the fuel gas discharge passage 34b in the direction indicated by the arrow A.

At the other end of the power generation cell 10 in the direction indicated by the arrow B (end in the direction indicated by the arrow B2), a fuel gas supply passage 34a, a coolant discharge passage 32b, and an oxygen-containing gas discharge passage 30b are arranged in the direction indicated by the arrow C. The fuel gas is supplied through the fuel gas supply passage 34a in the direction indicated by the arrow A. The coolant is discharged through the coolant discharge passage 32b in the direction indicated by the arrow A. The oxygen-containing gas is discharged through the oxygen-containing gas discharge passage 30b in the direction indicated by the arrow A.

The sizes, the positions, the shapes, and the numbers of the oxygen-containing gas supply passage 30a, the oxygen-containing gas discharge passage 30b, the fuel gas supply passage 34a, the fuel gas discharge passage 34b, the coolant supply passage 32a, and the coolant discharge passage 32b are not limited to the embodiment of the present invention, and may be determined as necessary depending on the required specification.

As shown in FIGS. 1 and 2, the first separator 16 has a fuel gas flow field 36 on its surface 16a facing the MEA 20. The fuel gas flow field 36 is connected to the fuel gas supply passage 34a and the fuel gas discharge passage 34b. The fuel gas flow field 36 includes a plurality of fuel gas flow grooves 38 extending in the direction indicated by the arrow B. Each of the fuel gas flow grooves 38 may extend in a wavy pattern in the direction indicated by the arrow B.

In FIG. 1, a first seal 40 is provided on the first separator 16, for preventing leakage of fluid (the fuel gas, the oxygen-containing gas, and the coolant) from positions between the resin frame equipped MEA 14 and the first separator 16. The first seal 40 is formed along the outer peripheral portion of the first separator 16, and provided around the fluid passages (oxygen-containing gas supply passage 30a, etc.). The first seal 40 extends straight as viewed in the separator thickness direction (direction indicated by the arrow A). It should be noted that the first seal 40 may extend in a wavy pattern as viewed in the separator thickness direction.

In FIG. 2, the first seal 40 includes a first metal bead 42 formed integrally with the first separator 16, and a first resin member 44 provided on the first metal bead 42. The first metal bead 42 protrudes from the first separator 16 toward the resin frame member 22. The first metal bead 42 has a trapezoidal shape in lateral cross section which is tapered (narrowed) in a protruding direction in which the first metal bead 42 protrudes. The first resin member 44 is an elastic member fixed to the protruding end surface of the first metal bead 42 by printing or coating, etc. For example, polyester fiber may be used as the first resin member 44.

As shown in FIGS. 1 and 2, the second separator 18 has an oxygen-containing gas flow field 46 on its surface 18a facing the MEA 20. The oxygen-containing gas flow field 46 is connected to the oxygen-containing gas supply passage 30a and the oxygen-containing gas discharge passage 30b. The oxygen-containing gas flow field 46 includes a plurality of oxygen-containing gas flow grooves 48 extending straight in the direction indicated by the arrow B. Each of the oxygen-containing gas flow grooves 48 may extend in a wavy pattern in the direction indicated by the arrow B.

As shown in FIG. 1, a second seal 50 is provided on the second separator 18, for preventing leakage of fluid (the fuel gas, the oxygen-containing gas, and the coolant) from positions between the resin frame equipped MEA 14 and the second separator 18. The second seal 50 is formed along the outer peripheral portion of the second separator 18, and provided around the fluid passages (oxygen-containing gas supply passage 30a, etc.). The second seal 50 extends straight as viewed in the separator thickness direction (direction indicated by the arrow A). It should be noted that the second seal 50 may extend in a wavy pattern as viewed in the separator thickness direction.

In FIG. 2, the second seal 50 includes a second metal bead 52 formed integrally with the second separator 18, and a second resin member 54 provided on the second metal bead 52. The second metal bead 52 protrudes from the second separator 18 toward the resin frame member 22. The second metal bead 52 has a trapezoidal shape in lateral cross section which is tapered (narrowed) in a protruding direction in which the second metal bead 52 protrudes. The second resin member 54 is an elastic member fixed to the protruding end surface of the second metal bead 52 by printing or coating, etc. For example, polyester fiber may be used as the second resin member 54.

The first seal 40 and the second seal 50 are disposed in a manner that the first seal 40 and the second seal 50 are overlapped with each other as viewed in the separator thickness direction. Therefore, in the state where a tightening load (compression load) is applied to the fuel cell stack 12, each of the first metal bead 42 and the second metal bead 52 is elastically deformed (deformed by compression). Further, in this state, the protruding end surface (the first resin member 44) of the first seal 40 contacts one surface 22a of the resin frame member 22 in an air-tight and liquid-tight manner, and the protruding end surface (second resin member 54) of the second seal 50 contacts the other surface 22b of the resin frame member 22 in an air-tight and liquid-tight manner.

The first resin member 44 may be provided on one surface 22a of the resin frame member 22 instead of the first metal bead 42. The second resin member 54 may be provided on the other surface 22b of the resin frame member 22 instead of the second metal bead 52. Further, at least one of the first resin member 44 and the second resin member 54 may be dispensed with. The first seal 40 and the second seal 50 may be in the form of elastic rubber seal members, instead of the metal bead seals as described above.

In FIGS. 1 and 2, a coolant flow field 56 is provided between the surface 16b of the first separator 16 and the surface 18b of the second separator 18. The coolant flow field 56 is connected to the coolant supply passage 32a and the coolant discharge passage 32b. The coolant flow field 56 is formed on the back surface of the oxygen-containing gas flow field 46 and the back surface of the fuel gas flow field 36.

Figure 3:
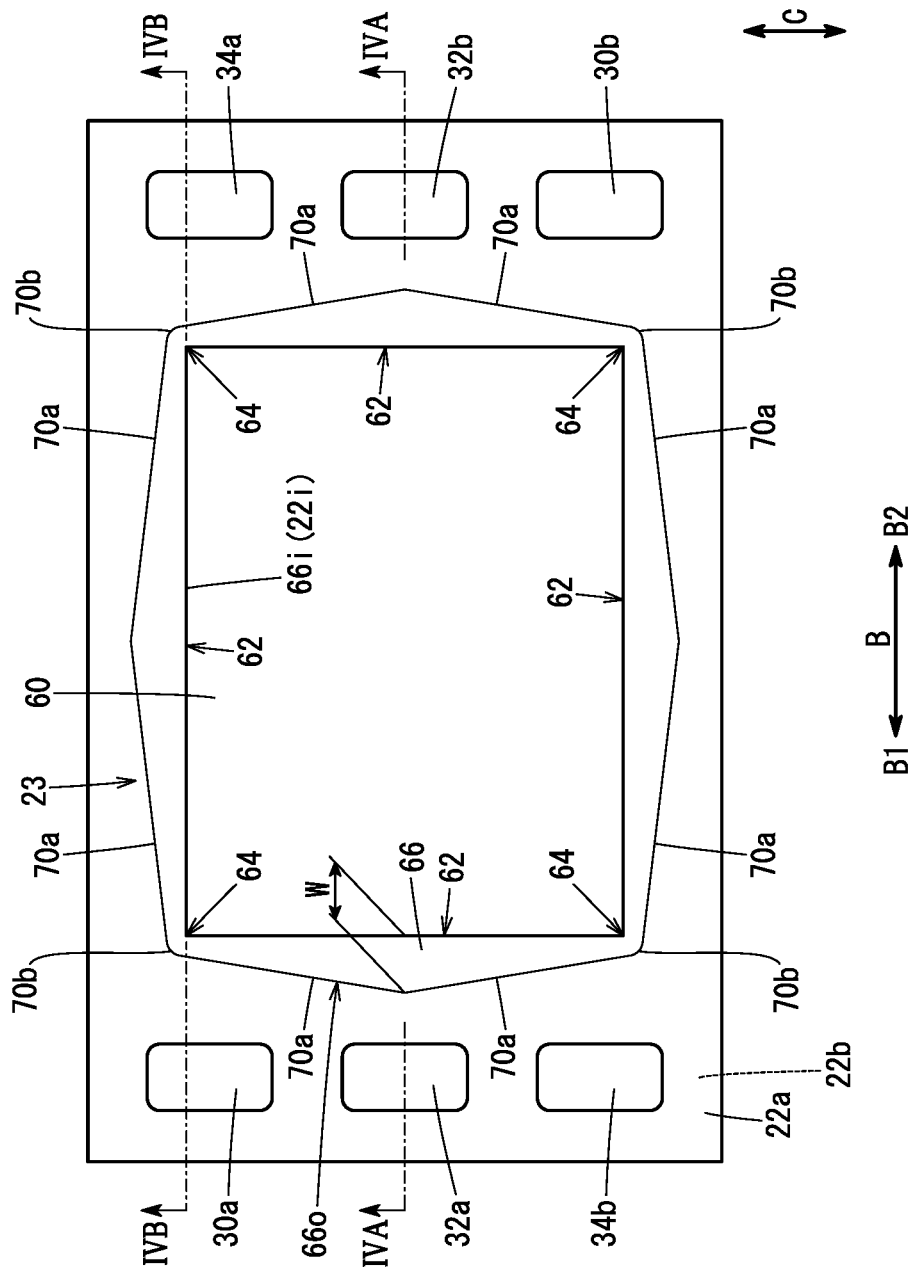
FIG. 3 is a plan view showing a resin frame member in FIG. 2.

As shown in FIGS. 1 and 3, the resin frame member 22 is formed in a quadrangular annular shape. That is, in FIG.

3, a quadrangular opening 60 is formed at the central part of the resin frame member 22. Therefore, as shown in FIGS. 1 to 3, an inner peripheral end 23 of the resin frame member 22 is formed in a quadrangular annular shape so as to surround the outer peripheral portion of the MEA 20. It should be noted that the inner peripheral end 23 of the resin frame member 22 is a portion forming an inner end (inner edge) 22i of the resin frame member 22 and an area in the vicinity of the inner end 22i of the resin frame member 22 (see FIG. 2).

As shown in FIG. 2, the inner peripheral end 23 of the resin frame member 22 is disposed between an outer peripheral portion 27 of the anode 26 and an outer peripheral portion 29 of the cathode 28. Specifically, the inner peripheral end 23 of the resin frame member 22 is sandwiched and held between the outer peripheral portion 25 of the electrolyte membrane 24 and the outer peripheral portion 29 of the cathode 28. It should be noted that the inner peripheral end 23 of the resin frame member 22 may be sandwiched and held between the outer peripheral portion 25 of the electrolyte membrane 24 and the outer peripheral portion 27 of the anode 26.

In FIG. 3, the inner peripheral end 23 of the resin frame member 22 includes four straight side parts 62 and four corner parts 64. As shown in FIGS. 2, 4A, and 4B, the inner peripheral end 23 of the resin frame member 22 is tapered (narrowed) toward the inner side of the resin frame member 22. Stated otherwise, the thickness (size in the direction indicated by the arrow A) of each of the inner peripheral end 23 is gradually reduced toward the inner side of the resin frame member 22. The inner peripheral end 23 has an inclined surface 66 which is inclined inward from one surface (first surface) 22a toward the other surface (second surface) 22b of the resin frame member 22. The inclined surface 66 extends over the entire periphery of the inner peripheral end 23 so as to surround the opening 60. That is, the inclined surface 66 has a quadrangular annular shape extending over the side parts 62 and the corner parts 64. The inclined surface 66 is a flat surface.

In FIG. 3, the inclined surface 66 gradually narrows from the center to both ends of each side part 62 in a direction in which the side part 62 extends. That is, the width W of the inclined surface 66 is reduced continuously from the center to both ends of each of the side parts 62 in a direction in which the side part 62 extends. The width W of the inclined surface 66 is largest at the center of each of the side parts 62, and smallest at the position of each of the corner parts 64. An outer peripheral end (outer edge) 66o of the inclined surface 66 includes straight parts 70a inclined inward from the center to both ends of each of the side parts 62 in a direction in which the side part 62 extends, and an R-shaped (i.e., rounded) coupling part 70b positioned at each of the corner parts 64 and connecting the adjacent straight parts 70a.

Each of the side parts 62 includes two straight parts 70a. The two straight parts 70a that are adjacent to each other are coupled together at the center of the side part 62 in the direction in which the side part 62 extends. That is, in each of the side parts 62, the inclined surface 66 has a chevron shape (triangular shape) having a vertex at the coupling portion coupling the two straight parts 70a. As viewed in the thickness direction of the resin frame member 22, the coupling part 70b has a circular arc shape.

As shown in FIG. 4A, an inner end (inner edge) 66i of the inclined surface 66 is positioned at an inner end (inner edge) 22i of the resin frame member 22. At the center of each side part 62 in the direction in which the side part 62 extends, the inner end 66i of the inclined surface 66 is positioned on the other surface (second surface) 22b of the resin frame member 22. As shown in FIG. 4B, the inner end 66i of the inclined surface 66 is inclined toward one surface (first surface) 22a of the resin frame member 22, from the center to both ends of the side part 62 in the extending direction of the side part 62. Stated otherwise, the thickness of the inner end 22i of the resin frame member 22 (dimension in the direction indicated by the arrow A) is gradually increased from the center to both ends of each side part 62 in the extending direction of the side part 62.

As shown in FIGS. 2, 4A and 4B, the inner peripheral end 23 of the resin frame member 22 is tapered (narrowed) toward the inner side of the resin frame member 22. Stated otherwise, the thickness (size in the direction indicated by the arrow A) of the inner peripheral end 23 is gradually reduced toward the inner side of the resin frame member 22.

As shown in FIG. 2, the inclination angle θ of the inclined surface 66 (angle formed between the other surface 22b of the resin frame member 22 and the inclined surface 66) is, for example, preferably, not more than 45°, more preferably, not less than 15° and not more than 30°, and still more preferably, about 20°. The inclination angle θ can be set as necessary. The inclination angle θ is substantially constant over the entire periphery of the inner peripheral end 23. It should be noted that the inclination angle θ may change at an appropriate position of the inner peripheral end 23 in the peripheral direction.

The inclined surface 66 faces the other surface 24b of the electrolyte membrane 24. Stated otherwise, the inclined surface 66 is positioned close to, or in contact with the other surface 24b of the electrolyte membrane 24. The thickness of the inner peripheral end 23 is gradually reduced toward the inside. Therefore, in comparison with a case where the inner peripheral end 23 does not include the inclined surface 66 (i.e., in a case where the lateral cross section of the inner peripheral end 23 has a quadrangular shape), a gap S formed on the inner side of the inner peripheral end 23 is smaller.

In FIG. 2, the outer peripheral portion 25 of the electrolyte membrane 24 includes a first inclined area 80a provided on a part thereof that faces the inclined surface 66 of the resin frame member 22. In the electrolyte membrane 24, a surface 80b facing the anode 26 and which is positioned outside the first inclined area 80a is farther away from the cathode 28, than a surface 80c facing the anode 26 and which is positioned inside the first inclined area 80a.

The outer peripheral portion 27 of the anode 26 includes a second inclined area 82a provided on a part thereof that faces the first inclined area 80a of the electrolyte membrane 24. The second inclined area 82a extends substantially in parallel with the first inclined area 80a. A surface 82b of the anode 26 facing toward the first separator 16 and which is positioned outside the second inclined area 82a is distanced from the cathode 28, in comparison with a surface 82c of the anode 26 facing toward the first separator 16 and which is positioned inside the second inclined area 82a.

A third inclined area 84a is provided in the outer peripheral portion 29 of the cathode 28, at a position overlapped with the inclined surface 66 of the resin frame member 22 in the thickness direction of the resin frame member 22 (in the direction indicated by the arrow A). The third inclined area 84a extends toward the outer peripheral end 28o of the cathode 28 obliquely so as to be separated away from the resin frame member 22. A surface 84b of the cathode 28 facing toward the second separator 18 and which is positioned outside the third inclined area 84a is distanced from the anode 26, in comparison with a surface 84c of the cathode 28 facing toward the second separator 18 and which is positioned inside the third inclined area 84a.

Next, operation of the fuel cell stack 12 including the power generation cell 10 according to the embodiment of the present invention will be described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil is supplied to the coolant supply passage 32a.

Therefore, the oxygen-containing gas flows from the oxygen-containing gas supply passage 30a into the oxygen-containing gas flow field 46 of the second separator 18, and moves in the direction indicated by the arrow B, and the oxygen-containing gas is supplied to the cathode 28 of the MEA 20. In the meanwhile, the fuel gas flows from the fuel gas supply passage 34a into the fuel gas flow field 36 of the first separator 16. The fuel gas flows along the fuel gas flow field 36 in the direction indicated by the arrow B, and the fuel gas is supplied to the anode 26 of the MEA 20.

Thus, in each of the MEAs 20, the oxygen-containing gas supplied to the cathode 28 and the fuel gas supplied to the anode 26 are consumed in the electrochemical reactions to perform power generation.

Then, in FIG. 1, the oxygen-containing gas supplied to the cathode 28 is consumed at the cathode 28, and the oxygen-containing gas is discharged along the oxygen-containing gas discharge passage 30b in the direction indicated by the arrow A. Likewise, the fuel gas supplied to the anode 26 is consumed at the anode 26, and the fuel gas is discharged along the fuel gas discharge passage 34b in the direction indicated by the arrow A.

Further, the coolant supplied to the coolant supply passage 32a flows into the coolant flow field 56 between the first separator 16 and the second separator 18, and thereafter, flows in the direction indicated by the arrow B. After the coolant cools the MEA 20, the coolant is discharged from the coolant discharge passage 32b.

Next, a method of producing the resin frame member 22 according to the embodiment will be described below.

Figure 5:
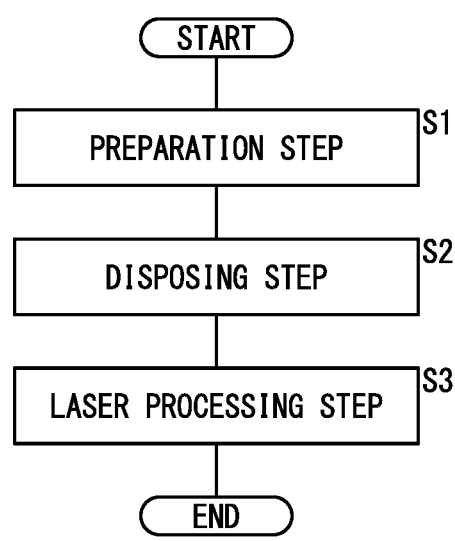
FIG. 5 is a flow chart illustrating a method of producing a resin frame member shown in FIG. 3.

As shown in FIG. 5, the method of producing the resin frame member 22 includes a preparation step, a disposing step, and a laser processing step.

Figure 6:
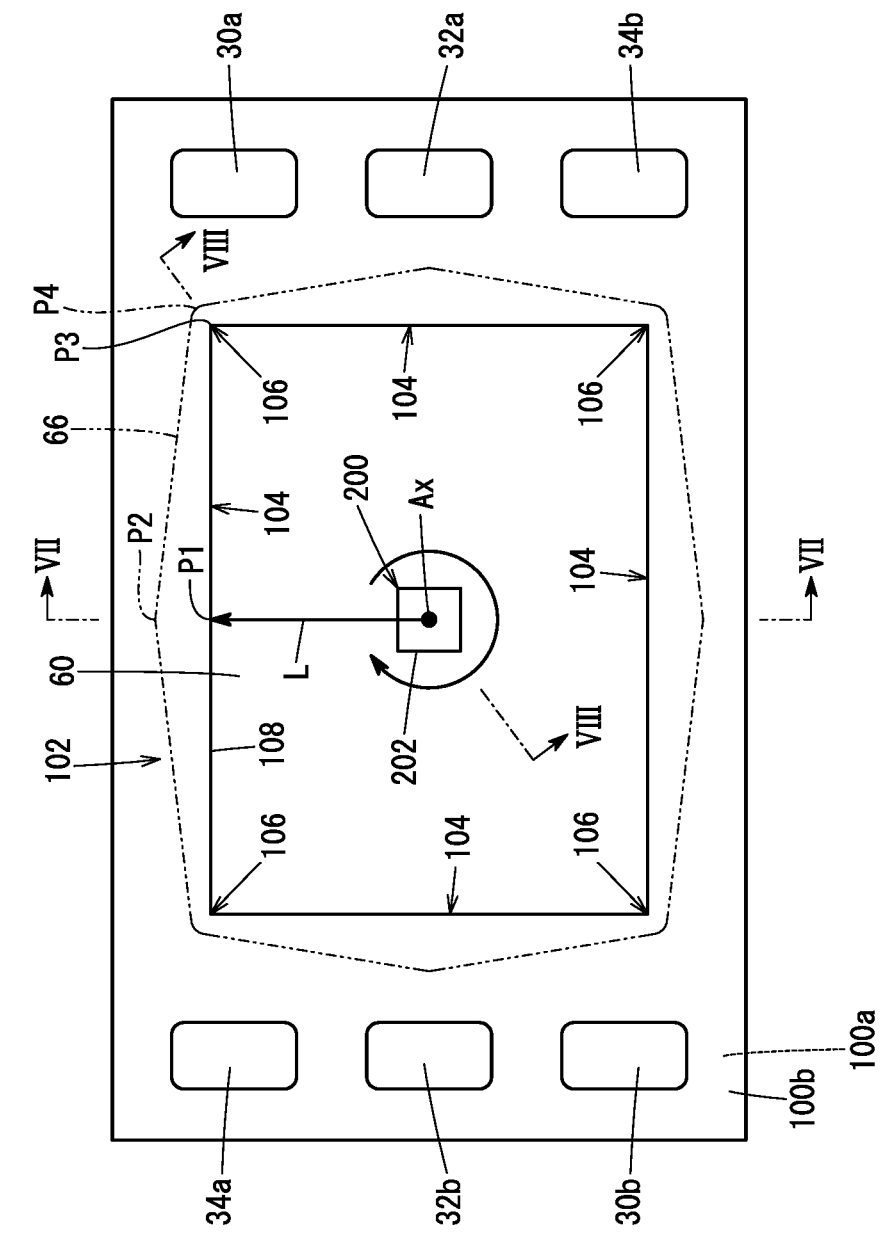
FIG. 6 is a view showing a disposing step and a laser processing step.

In the preparation step (step S1), a resin film 100 as shown in FIG. 6 is prepared. The resin film 100 has a laterally elongated rectangular shape. The resin film 100 has a quadrangular opening 60 at the center thereof. That is, the resin film 100 has a quadrangular annular shape. An inner peripheral end 102 of the resin film 100 includes four side parts 104, and four corner parts 106.

At one end of the resin film 100 in the long side direction, the oxygen-containing gas supply passage 30a, the coolant supply passage 32a, and the fuel gas discharge passage 34b are formed. At the other end of the resin film 100 in the longitudinal direction, the fuel gas supply passage 34a, the coolant discharge passage 32b, and the oxygen-containing gas discharge passage 30b are formed. It should be noted that the oxygen-containing gas supply passage 30a, the oxygen-containing gas discharge passage 30b, the coolant supply passage 32a, the coolant discharge passage 32b, the fuel gas supply passage 34a, and the fuel gas discharge passage 34b may be formed in the resin film 100 after finishing the laser processing step.

Figure 7:
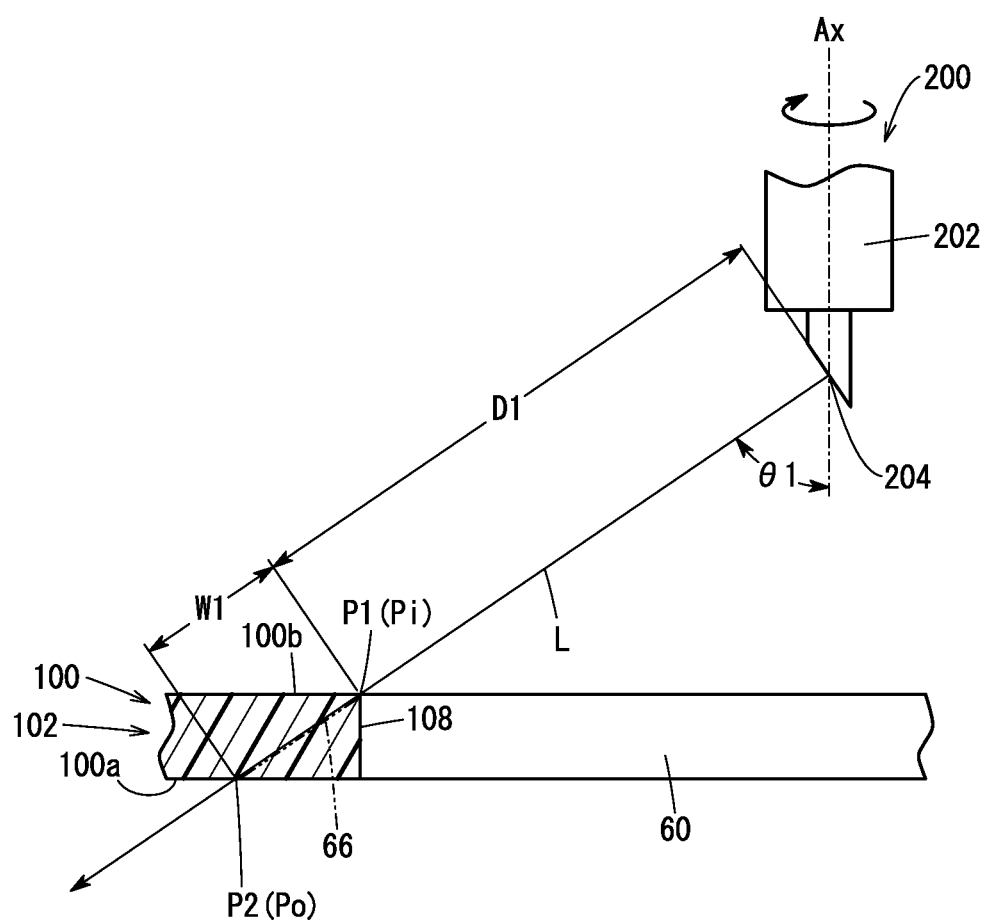
FIG. 7 is a partial cross sectional view taken along a line VII-VII in FIG. 6.
Figure 8:
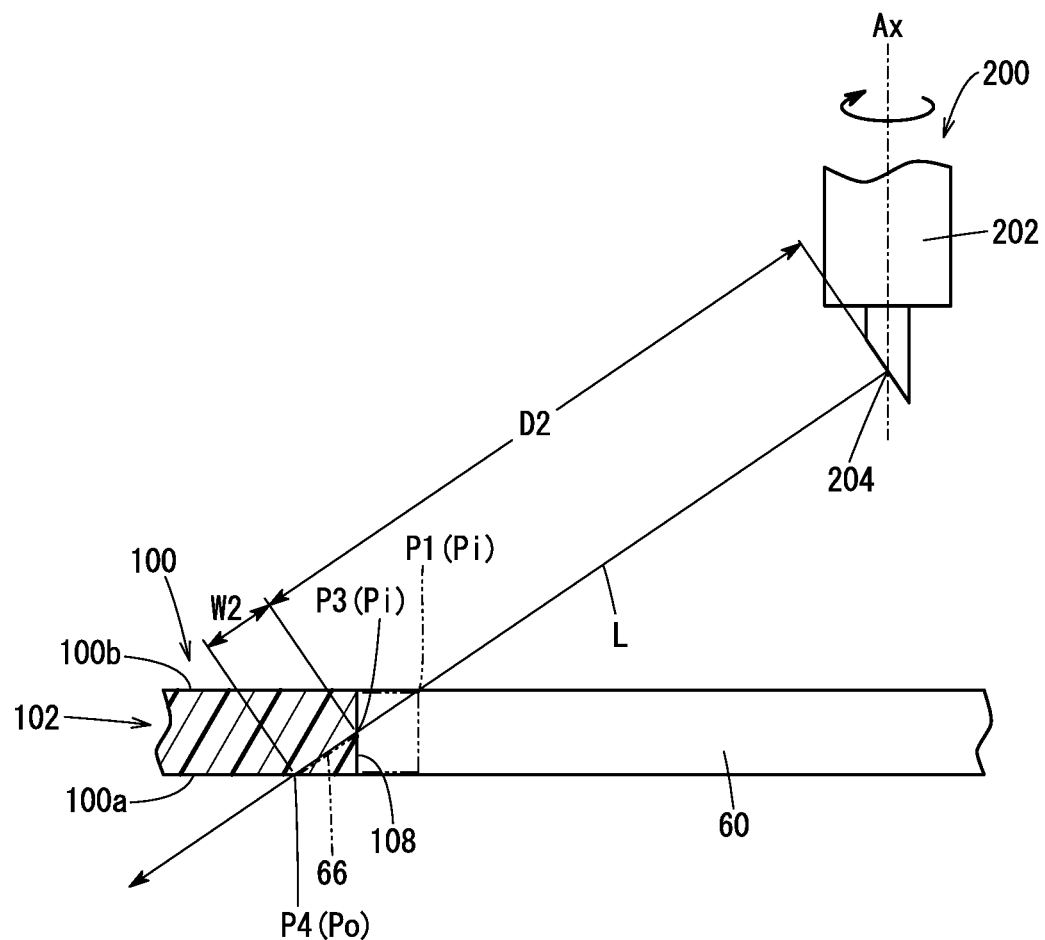
FIG. 8 is a partial cross sectional view taken along a line VIII-VIII in FIG. 6.

In the disposing step (step S2), as shown in FIGS. 6 to 8, a laser processing head 202 of a laser irradiation device 200 is disposed at the center of the opening 60 of the resin film 100. In FIGS. 7 and 8, the laser processing head 202 is provided with a laser emission port 204 for emitting a laser beam L. The laser processing head 202 passes through the center of the opening 60 (i.e., the center of the long side and the center of the short side of the opening 60), and the laser processing head 202 is rotatable about a rotation axis Ax positioned at the center of the opening 60 and extending along the thickness direction (direction indicated by the arrow A) of the resin film 100.

The laser emission port 204 is located on the rotation axis Ax. The laser emission port 204 is oriented in an inclination direction intersecting with the planar direction of the resin film 100 and the thickness direction of the resin film 100. That is, the optical axis of the laser beam L emitted from the laser emission port 204 is oriented in the inclination direction. The irradiation angle θ1 of the laser beam L (i.e., the angle formed between the rotation axis Ax and the laser beam L) is set as appropriate depending on, e.g., the size of the opening 60 of the resin film 100 and the thickness of the resin film 100.

The laser emission port 204 is spaced from the resin film 100 in the thickness direction of the resin film 100. One surface 100a of the resin film 100 faces away from the laser processing head 202. The other surface 100b of the resin film 100 faces toward the laser processing head 202.

In the laser processing step (step S3), the inner peripheral end 102 of the resin film 100 is irradiated with the laser beam L from the laser emission port 204 to thereby form the inclined surface 66 at the inner peripheral end 102. Stated otherwise, in the laser processing step, the laser beam L is applied to the inner peripheral end 102 over the entire periphery in a state where the optical axis of the laser beam L is oriented in the inclination direction intersecting with the planar direction of the resin film 100 and the thickness direction of the resin film 100.

Specifically, in the laser processing step, the laser processing head 202 (laser emission port 204) is rotated at least once about the rotation axis Ax in the state where the laser emission port 204 is oriented in the inclination direction. At this time, the relative position of the laser emission port 204 relative to the resin film 100 in the thickness direction of the resin film 100 is fixed. Stated otherwise, the laser emission port 204 is rotated at least once about the rotation axis Ax without moving the laser emission port 204 relative to the resin film 100 in the thickness direction. Further, the laser emission port 204 is rotated at least once about the rotation axis Ax in the state where the irradiation angle θ1 of the laser beam L is kept constant.

As shown in FIG. 7, the laser beam L emitted from the laser emission port 204 enters the resin film 100 from an incident point (incoming point) Pi in the inner peripheral end 102 of the resin film 100 and, exits the resin film 100 from an outgoing point Po. A portion of the resin film 100 through which the laser beam L passes becomes a cut surface (inclined surface 66 of the resin frame member 22). The laser beam L passes through the inside of the resin film 100 substantially straight.

In FIG. 6, the distance between the laser emission port 204 and the inner peripheral end 102 of the resin film 100 (laser irradiation distance) is increased gradually from the center toward both ends (i.e., toward the corner parts 106) of each of the side parts 104 of the inner peripheral end 102 in the direction in which the side part 104 extends. That is, the laser irradiation distance (first laser irradiation distance D1) at the center of the side part 104 forming the long side of the inner peripheral end 102 is shorter than the laser irradiation distance (second laser irradiation distance D2) at the corner parts 106 of the inner peripheral end 102 (see FIGS. 7 and 8).

As shown in FIG. 7, at the center of the side part 104 forming the long side of the inner peripheral end 102, the laser beam L enters the resin film 100 from a first incident point P1 and exits the resin film 100 from a first outgoing point P2. For example, the first incident point P1 is positioned at an edge of an inner end surface 108 of the resin film 100 that is closer to the other surface 100b of the resin film 100. However, the first incident point P1 may be positioned outside the inner end surface 108 and on the other surface 100b of the resin film 100, or may be positioned on the inner end surface 108 (surface forming the opening 60) of the resin film 100. The first outgoing point P2 is positioned outside the inner end surface 108 and on one surface 100a of the resin film 100. The first outgoing point P2 is positioned outside the first incident point P1.

As shown in FIG. 8, in each corner part 106 of the inner peripheral end 102, the laser beam L enters the resin film 100 from a second incident point P3, and exits the resin film 100 from a second outgoing point P4. The second incident point P3 is positioned on the inner end surface 108 of the resin film 100. The second outgoing point P4 is positioned outside the inner end surface 108 and on one surface 100a of the resin film 100. The second outgoing point P4 is positioned outside the second incident point P3.

In FIGS. 7 and 8, the second incident point P3 is positioned closer to one surface 100a of the resin film 100, than the first incident point P1. The first straight distance W1 between the first incident point P1 and the first outgoing point P2 (width of the inclined surface 66) is larger than the second straight distance W2 between the second incident point P3 and the second outgoing point P4 (width of the inclined surface 66). The straight distance between the incident point Pi and the outgoing point Po (width of the inclined surface 66) is gradually reduced from the center toward the ends (i.e., toward the corner parts 106) of the inner peripheral end 102 (see FIG. 6). The difference between the first straight distance W1 and the second straight distance W2 becomes larger as the difference between the first laser irradiation distance D1 and the second laser irradiation distance D2 becomes larger.

The resin frame equipped MEA 14 and the method of producing the resin frame member 22 (resin frame member for the fuel cell) according to the embodiment of the present invention offers the following advantages.

The inner peripheral end 23 of the resin frame member 22 is formed in a quadrangular annular shape so as to surround the outer peripheral portion of the MEA 20, and is disposed between the outer peripheral portion 27 of the anode 26 and an outer peripheral portion 29 of the cathode 28. The inner peripheral end 23 of the resin frame member 22 includes the inclined surface 66 formed over the entire periphery, the inclined surface 66 being inclined inward from one surface (first surface) 22a of the resin frame member 22 toward the other surface (second surface) 22b of the resin frame member 22. The width of the inclined surface 66 is gradually reduced in a direction from the center to both ends of each side part 62 in a direction in which each side part 62 of the inner peripheral end 23 extends.

The method of producing the resin frame member 22 includes a disposing step of disposing a laser emission port 204 at the center of the opening 60 of the resin film 100 and a laser processing step of irradiating the inner peripheral end 102 of the resin film 100 with a laser beam L emitted from the laser emission port 204 disposed at the center of the opening 60, to thereby form the inclined surface 66 at the inner peripheral end 102. In the laser processing step, the laser beam L is applied to the inner peripheral end 102 over the entire periphery in the state where the optical axis of the laser beam L is oriented in the inclination direction intersecting with a planar direction of the resin film 100 and a thickness direction of the resin film 100. At this time, preferably, the height of the laser emission port 204 from the other surface 100b of the resin film 100 is constant.

In the above structure and the above method, the inner peripheral end 23 of the resin frame member 22 includes the inclined surface 66. That is, the thickness of the inner peripheral end 23 of the resin frame member 22 is gradually reduced toward the inside. Therefore, it is possible to reduce the gap S on the inner side of the inner peripheral end 23 of the resin frame member 22. Therefore, since the area of the power generation region is increased, it is possible to improve the power generation efficiency.

Further, the laser beam L emitted from the laser emission port 204 disposed at the center of the opening 60 of the resin film 100 is applied to the inner peripheral end 102 of the resin film 100 over the entire periphery to thereby form the inclined surface 66. At this time, the width of the inclined surface 66 is gradually reduced in the direction from the center toward both ends of each of the side parts 104 of the inner peripheral ends 102 of the resin frame member 22 in the direction in which each of the side parts 104 extends. In this case, it is sufficient to fix the laser emission port 204 at the center of the opening 60 and rotate the laser emission port 204. It is not required to move the laser emission port 204 along a quadrangular pattern defined by the inner peripheral end 102 of the resin film 100. Therefore, it is possible to reduce the cycle time in the laser processing step. Accordingly, it is possible to improve the production efficiency of the resin frame member 22.

The inclined surface 66 faces the electrolyte membrane 24.

In the structure, it is possible to reduce or eliminate situations where the inner peripheral end 23 of the resin frame member 22 pierces the electrolyte membrane 24. Therefore, it is possible to suppress damage to the electrolyte membrane 24.

The inclined surface 66 is provided at each corner part 64 of the inner peripheral end 23. Part (coupling part 70b) of the outer peripheral end 66o of the inclined surface 66 that is positioned at each corner part 64 of the inner peripheral end 23, is formed to have an R-shape (a rounded shape).

In the structure, since each of the corner parts 64 of the inner peripheral end 23 of the resin frame member 22 includes the inclined surface 66, and the area of the power generation area is increased much more, it is possible to improve the power generation efficiency to a greater extent.

In the laser processing step, in the state where the laser emission port 204 is oriented in the inclination direction intersecting with the planar direction of the resin film 100 and the thickness direction of the resin film 100, the laser emission port 204 is rotated at least once about the rotation axis Ax passing through the center of the opening 60 and extending along the thickness direction of the resin film 100.

In this method, it is possible to reduce the cycle time of the laser processing step to a greater extent.

In the laser processing step, the laser emission port 204 is rotated at least once about the rotation axis Ax in the state where the relative position of the laser emission port 204 relative to the resin film 100 in the thickness direction of the resin film 100 is fixed.

In this method, in the laser processing step, it is possible to perform a position control of the laser emission port 204 easily.

The present invention is not limited to the above described embodiment. Various modifications can be made without departing from the essence and gist of the present invention. In the laser processing step, the laser beam L may be applied to the inner peripheral end 102 of the resin film 100 over the entire periphery, while changing the relative position of the laser emission port 204 relative to the resin film 100 in the thickness direction of the resin film 100. In this manner, it is possible to change the width of the inclined surface 66 at a suitable position of the inner peripheral end 23 of the resin frame member 22. Further, in the laser processing step, the laser light L may be applied to the inner peripheral end 102 of the resin film 100 over the entire periphery while changing the irradiation angle θ1 of the laser beam L.

In the laser processing step, for example, the optical system such as a mirror is controlled in the state where the laser emission port 204 is oriented toward the opening 60 to apply the laser beam L to the inner peripheral end 102 of the resin film 100 over the entire periphery.

The above embodiment is summarized as follows.

The above embodiment discloses the resin frame equipped membrane electrode assembly (14). The resin frame equipped membrane electrode assembly includes the membrane electrode assembly (20) and the resin frame member (22) provided on an outer peripheral portion of the membrane electrode assembly. The membrane electrode assembly includes the electrolyte membrane (24), the first electrode (26) provided on one surface (24*a*) of the electrolyte membrane, and the second electrode (28) provided on the other surface (24*b*) of the electrolyte membrane. The inner peripheral end (23) of the resin frame member is formed in a quadrangular annular shape so as to surround the outer peripheral portion of the membrane electrode assembly, and is disposed between an outer peripheral portion (27) of the first electrode and an outer peripheral portion (29) of the second electrode. The inner peripheral end includes the inclined surface (66) formed over the entire periphery, the inclined surface being inclined inward from one surface (first surface) of the resin frame member toward the other surface (second surface) of the resin frame member, and the width of the inclined surface is gradually reduced from the center toward both ends of each side part of the inner peripheral end in a direction in which the side part (62) of the inner peripheral end extends.

In the resin frame equipped membrane electrode assembly, the inclined surface may be configured to face the electrolyte membrane.

In the resin frame equipped membrane electrode assembly, the outer peripheral end (66*o*) of the inclined surface may extend straight so as to be inclined inward from the center toward each of the both ends of each side part of the inner peripheral end in the direction in which the side part extends.

In the resin frame equipped membrane electrode assembly, the inclined surface may be provided at each corner part (64) of the inner peripheral end, and a part (70*b*) of an outer peripheral end of the inclined surface that is positioned at the corner part of the inner peripheral end, may be formed to have a rounded shape.

In the resin frame equipped membrane electrode assembly, at the center in the direction in which each side part of the inner peripheral end extends, the inner end (66*i*) of the inclined surface may be positioned on the other surface (second surface) of the resin frame member.

In the resin frame equipped membrane electrode assembly, the inner end of the inclined surface may be inclined toward one surface (first surface) of the resin frame member, in a direction from the center toward the both ends of each side part of the inner peripheral end.

The above embodiment discloses the method of producing a resin frame member for a fuel cell by forming the inclined surface at the inner peripheral end (102) surrounding the quadrangular opening (60) formed in the central part of the resin film (100), the resin frame member being provided on the outer peripheral portion of a membrane electrode assembly. The method includes the disposing step of disposing the laser emission port (204) at the center of the opening of the resin film, and the laser processing step of irradiating the inner peripheral end with a laser beam (L) emitted from the laser emission port disposed at the center of the opening to thereby form the inclined surface at the inner peripheral end. In the laser processing step, the laser beam is applied to the inner peripheral end over the entire periphery thereof in the state where the optical axis of the laser beam is oriented in an inclination direction intersecting with a planar direction of the resin film and a thickness direction of the resin film.

In the method of producing the resin frame member for the fuel cell, in the laser processing step, in the state where the laser emission port is oriented in the inclination direction, the laser emission port may be rotated at least once about a rotation axis (Ax) passing through the center of the opening and extending along the thickness direction of the resin film.

In the method of producing the resin frame member for the fuel cell, in the laser processing step, in the state where the relative position of the laser emission port relative to the resin film in the thickness direction of the resin film is fixed, the laser emission port may be rotated at least once about the rotation axis.

In the method of producing the resin frame member for the fuel cell, in the laser processing step, while changing the relative position of the laser emission port relative to the resin film in the thickness direction of the resin film, the laser emission port may be rotated at least once about the rotational axis.

What is claimed is:

1. A resin frame equipped membrane electrode assembly comprising:
   a membrane electrode assembly including an electrolyte membrane, a first electrode provided on one surface of the electrolyte membrane, and a second electrode provided on another surface of the electrolyte membrane; and
   a resin frame member provided on an outer peripheral portion of the membrane electrode assembly,
   wherein an inner peripheral end of the resin frame member is formed in a quadrangular annular shape so as to surround the outer peripheral portion of the membrane electrode assembly, and is disposed between an outer peripheral portion of the first electrode and an outer peripheral portion of the second electrode; and
   the inner peripheral end includes an inclined surface formed over an entire periphery thereof, the inclined surface being inclined inward from a first surface of the resin frame member toward a second surface of the resin frame member; and
   a width of the inclined surface is gradually reduced from a center toward both ends of each side part of the inner peripheral end in a direction in which the side part of the inner peripheral end extends.

2. The resin frame equipped membrane electrode assembly according to claim 1, wherein the inclined surface is configured to face the electrolyte membrane.

3. The resin frame equipped membrane electrode assembly according to claim 1, wherein an outer peripheral end of the inclined surface extends straight so as to be inclined inward from the center toward each of the both ends of each side part of the inner peripheral end in the direction in which the side part extends.

4. The resin frame equipped membrane electrode assembly according to claim 1, wherein the inclined surface is provided at each corner part of the inner peripheral end; and
- a part of an outer peripheral end of the inclined surface that is positioned at the corner part of the inner peripheral end, is formed to have a rounded shape.

5. The resin frame equipped membrane electrode assembly according to claim 1, wherein at the center in the direction in which each side part of the inner peripheral end extends, an inner end of the inclined surface is positioned on the second surface of the resin frame member.

6. The resin frame equipped membrane electrode assembly according to claim 5, wherein the inner end of the inclined surface is inclined toward the first surface of the resin frame member, in a direction from the center toward the both ends of each side part of the inner peripheral end.

7. A method of producing a resin frame member for a fuel cell by forming an inclined surface at an inner peripheral end surrounding a quadrangular opening formed in a central part of the resin film, the resin frame member being provided on an outer peripheral portion of a membrane electrode assembly, the method comprising:
disposing a laser emission port at a center of the opening of the resin film; and
irradiating the inner peripheral end with a laser beam emitted from the laser emission port disposed at the center of the opening to thereby form the inclined surface at the inner peripheral end, wherein, in the irradiating of the inner peripheral end with the laser beam, the laser beam is applied to the inner peripheral end over an entire periphery thereof in a state where an optical axis of the laser beam is oriented in an inclination direction intersecting with a planar direction of the resin film and a thickness direction of the resin film.

8. The method of producing the resin frame member for the fuel cell according to claim 7, wherein in the irradiating of the inner peripheral end with the laser beam, in a state where the laser emission port is oriented in the inclination direction, the laser emission port is rotated at least once about a rotation axis passing through the center of the opening and extending along the thickness direction of the resin film.

9. The method of producing the resin frame member for the fuel cell according to claim 8, wherein in the irradiating of the inner peripheral end with the laser beam, in a state where a relative position of the laser emission port relative to the resin film in the thickness direction of the resin film is fixed, the laser emission port is rotated at least once about the rotation axis.

10. The method of producing the resin frame member for the fuel cell according to claim 8, wherein, in the irradiating of the inner peripheral end with the laser beam, while changing a relative position of the laser emission port relative to the resin film in the thickness direction of the resin film, the laser emission port is rotated at least once about the rotational axis.

* * * * *